United States Patent
Pho

(10) Patent No.: US 9,081,689 B2
(45) Date of Patent: Jul. 14, 2015

(54) METHODS AND SYSTEMS FOR PUSHING DIRTY LINEFILL BUFFER CONTENTS TO EXTERNAL BUS UPON LINEFILL REQUEST FAILURES

(71) Applicant: Quyen Pho, Pflugerville, TX (US)

(72) Inventor: Quyen Pho, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 235 days.

(21) Appl. No.: 13/740,404

(22) Filed: Jan. 14, 2013

(65) Prior Publication Data

US 2014/0201454 A1    Jul. 17, 2014

(51) Int. Cl.
*G06F 12/12* (2006.01)
*G06F 12/08* (2006.01)

(52) U.S. Cl.
CPC ........ *G06F 12/0859* (2013.01); *G06F 12/0804* (2013.01); *G06F 12/12* (2013.01); *G06F 2212/1032* (2013.01)

(58) Field of Classification Search
CPC ............ G06F 12/0804; G06F 12/0859; G06F 2212/1032

USPC .......................................................... 711/144
See application file for complete search history.

(56) References Cited

U.S. PATENT DOCUMENTS

| | | | |
|---|---|---|---|
| 5,197,144 A * | 3/1993 | Edenfield et al. ............. | 711/143 |
| 5,367,660 A | 11/1994 | Gat et al. | |
| 7,120,755 B2 | 10/2006 | Jamil et al. | |
| 2008/0109606 A1* | 5/2008 | Lataille et al. ................ | 711/133 |
| 2008/0148029 A1* | 6/2008 | Luc et al. ....................... | 712/300 |
| 2008/0229070 A1* | 9/2008 | Charra et al. ................. | 712/207 |
| 2009/0300294 A1 | 12/2009 | Moyer et al. | |

* cited by examiner

*Primary Examiner* — Yong Choe
(74) *Attorney, Agent, or Firm* — Egan, Petterman & Enders LLP.

(57) ABSTRACT

Methods and systems are disclosed for recovering dirty linefill buffer data upon linefill request failures. When a linefill request failure occurs and the linefill buffer has been marked as dirty, such as due to a system bus failure, the contents of the linefill buffer are pushed back to the system bus. The dirty data within the linefill buffer can then be used to update the external memory. The disclosed embodiments are useful for a wide variety of applications, including those requiring low data failure rates.

22 Claims, 5 Drawing Sheets

FIG. 1 -PRIOR ART-

METHODS AND SYSTEMS FOR PUSHING DIRTY LINEFILL BUFFER CONTENTS TO EXTERNAL BUS UPON LINEFILL REQUEST FAILURES

TECHNICAL FIELD

The technical field relates to linefill buffers for cache systems and, more particularly, to the recovery of dirty data within linefill buffers upon the occurrence of failures during linefill requests.

BACKGROUND

Cache systems for processors often include buffers that are used to facilitate the handling of data that is being transferred between external memory and a memory cache. Caches are coupled to processors through higher speed internal bus connections and are used to reduce processing time required for processors to access and execute instructions. For some cache systems, linefill buffers and store buffers are used to facilitate instruction data transfer between external memory and caches.

FIG. 1 (Prior Art) is a block diagram of an example embodiment 100 for a cache system. A load/store unit 102, which communicates with a processor (not shown), provides control signals 121 to a cache controller (CTRL) 107 and control and/or data signals 120, 122, and 124 to a linefill buffer 108, a cache 106, and a store buffer 104, respectively. The cache 106 communicates data to and from the bus interface unit (BIU) 110 through connection 128. The cache 106 also sends data to the store buffer 104 using connection 132. The store buffer 104 sends data to the bus interface unit (BIU) 110 through connection 126. Linefill buffer 108 receives data from the bus interface unit (BIU) 110 through connection 130 and sends data to cache 106 through connection 134. The cache controller (CTRL) 107 provides control signals to the linefill buffer 108, the cache 106, and the store buffer 104. When bus access is desired, the store buffer 104, the cache 106, and the linefill buffer 108 provide bus request signals 140, 142, and 144 to multiplexer (MUX) 112, respectively. A request select (REQUEST SELECT) signal 116 is provided to multiplexer (MUX) 112 to determine which of the bus request signals 142, 144, and 146 is provided as the bus request (BUS REQUEST) signal 114 to the bus interface unit (BIU) 110. The bus interface unit (BIU) 110 communicates data to and from a main memory using a system bus coupled to connection 118.

During a linefill operation to transfer a cache line to the cache 106, the linefill buffer 108 is used to temporarily hold the cache line while it is in the process of being filled by a transfer of data from external memory. The linefill buffer 108 is a set of registers and is sized to hold address and data information for the cache line. The data is organized, for example, in double-word entries. The linefill buffer 108 also includes a set of status bits that are used to track the progress of the line. These status bits can include a valid bit and a busy bit. The valid bit indicates if the data within the linefill buffer 108 is valid, and the busy bit indicates if the linefill buffer 108 is still collecting data from the external system bus. When the linefill buffer 108 is no longer busy (i.e., data for the whole line has come back from the system bus), the cache line within the linefill buffer 108 is pushed into the cache array 106, and the status bits for the linefill buffer 108 are updated accordingly.

During the window of time when the linefill buffer 108 is still busy, a new load can be issued from the processor. If so, the load/store unit 102 and the cache 106 will target the line in the linefill buffer 108, and the data for that load will be supplied by the linefill buffer 108. Further, when the linefill buffer 108 is busy, the load/store unit 102 for the processor may issue a store that targets the linefill buffer 108. If this occurs, the cache controller (CTRL) 107 will perform operations to handle the requested store. First, the linefill buffer 108 captures the store data into the double-word entry targeted for the store and updates byte strobes for that entry to identify which bytes are valid. The byte strobes are additional status bits in the linefill buffer 108 that are used to remember valid store bytes because a store can be smaller than an entire double-word entry down to one byte. The next store, if targeting the same double-word entry, will override the data of the current byte strobes. Read data coming back from the bus for a linefill request can only be written to bytes that are not yet marked valid. The linefill buffer 108 uses these linefill mechanisms to gather the latest data from both the processor load/store unit 102 and the external bus prior to writing it into the cache 106.

After a store has written data into the linefill buffer 108, if the line is in write-through mode, the store can proceed to go out to the system bus or to the store buffer 104, depending on its attributes. This process will eventually be used to update the external memory with the latest data. This operation also ensures the coherency of the external memory and the contents of the cache 106. However, if the store writes to a copyback line in the linefill buffer 108, the cache controller (CTRL) 107 need not write the store out to the external bus. Instead the cache controller (CTRL) 107 can retire the store after writing it to the linefill buffer 108. Additionally, the cache controller (CTRL) 107 can mark the linefill buffer as dirty after this write, for example, by setting the dirty bit. The dirty bit is an additional status bit in the linefill buffer 108. Dirty bits are also part of the cache line status bits that are stored for cache lines in the cache 106. When set, the dirty bit indicates that the data in the cache line is newer data as compared to the data stored in the main memory.

Once the linefill buffer 108 has received all of the data from the system bus for the linefill request, it pushes the cache line into the cache 106 and invalidates the data within linefill buffer 108. Subsequent loads and stores which are hitting that cache line will be directed to the cache 106 and not the linefill buffer 108. If an event, such as a bus failure, prevents the system bus from returning all of the data to the linefill buffer 108 as part of the linefill request, the contents of the linefill buffer 108 are discarded. However, this discarding of contents of the linefill buffer 108 creates a problem if the linefill buffer 108 is dirty (e.g., holding data that is newer than the data in the external memory). If the dirty data within the linefill buffer 108 is discarded, then the most recent data is lost.

Although bus failure events during a linefill request are unlikely to occur, some applications (e.g., medical and automotive applications) require a high level of failure recovery that would include recovery of dirty data within the linefill buffer during such a bus failure. FIG. 1 (Prior Art) addresses this potential loss of dirty data by always storing a copy of the linefill buffer 108 in the store buffer 104 during a linefill request. This linefill buffer copy (LFB COPY) 136, however, takes up cache lines within the store buffer 104 and can delay other operations of the store buffer 104 as the store buffer 104 waits for the linefill request to complete. In particular, the contents of the store buffer 104 are primarily used for store operations by the load/store unit 102. Thus, while the LFB COPY 136 stored in the store buffer 104 protects against loss of dirty linefill data within linefill buffer 108, this LFB COPY 136 also reduces the efficiency of the store buffer 104 by taking up cache lines within the store buffer 104 and potentially stalling the store operations for the store buffer 108.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale FIG. 1 (Prior Art) is a block diagram of an example embodiment for a cache system that places a copy of a linefill buffer into a store buffer.

DETAILED DESCRIPTION

Methods and systems are disclosed for recovering dirty linefill buffer data upon linefill request failures. When a linefill request failure occurs and the linefill buffer has been marked as dirty, the contents of the linefill buffer are pushed to an external bus to recover the dirty linefill buffer data. The dirty linefill buffer data can then be used to update external memory. Different features and variations can be implemented, as desired, and related or modified systems and methods can be utilized, as well.

Figure 1:
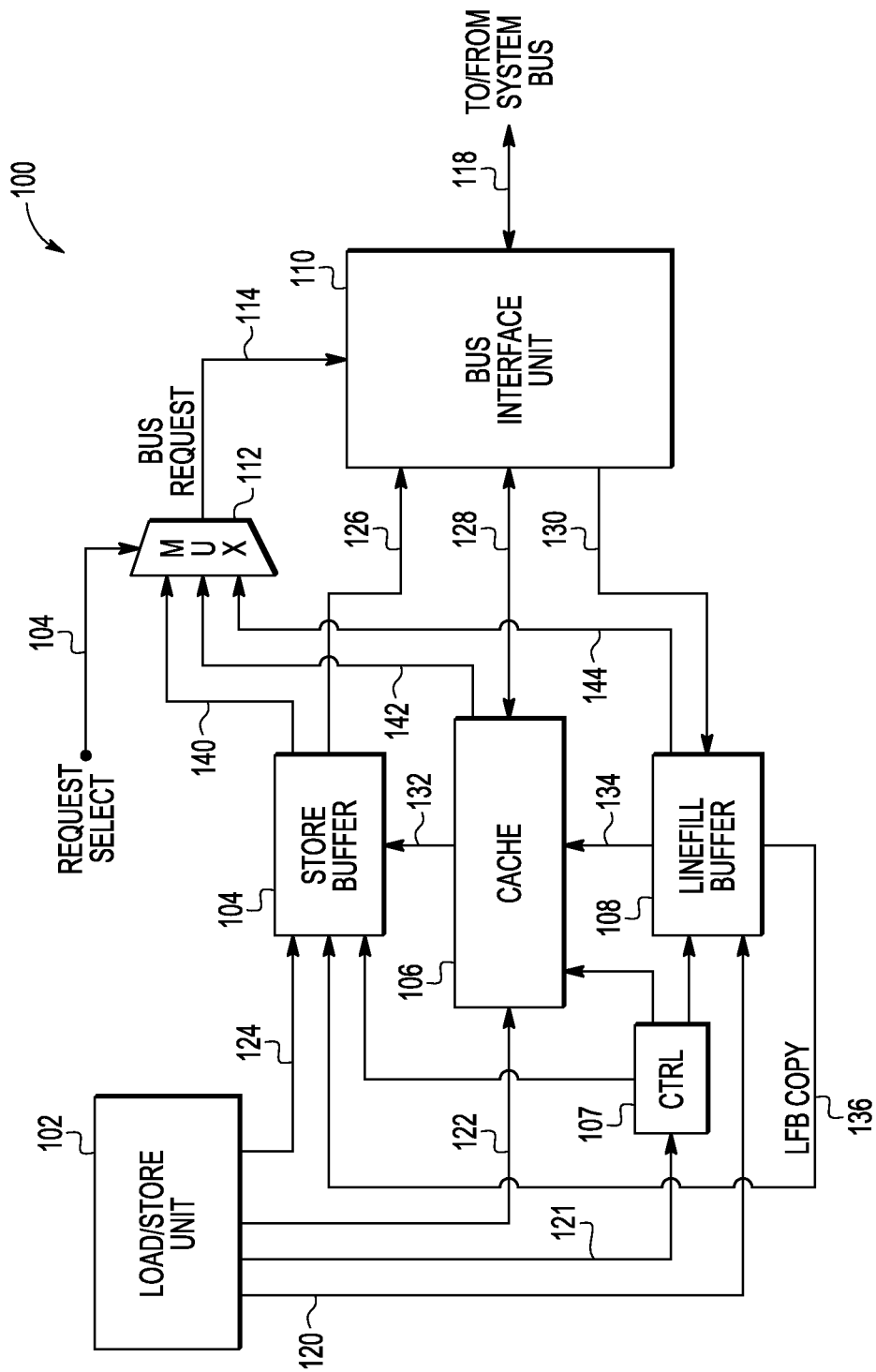
Figure 2:
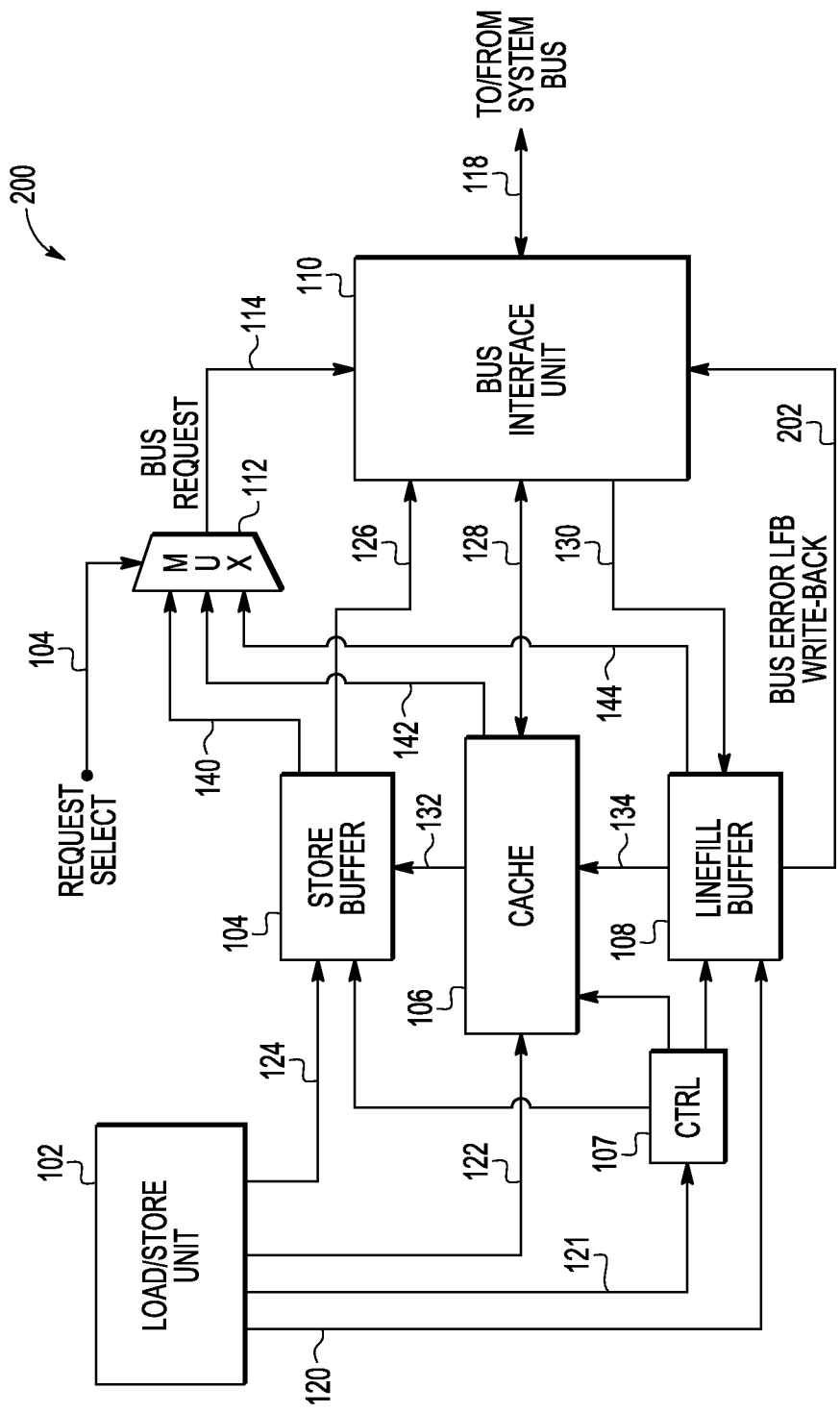
FIG. 2 is a block diagram of an example embodiment for a cache system that provides a write-back of linefill buffer data to a system bus upon a failure during a linefill request.

As described herein, rather than use a linefill buffer simply to hold temporarily pending cache line data during linefill requests, the contents of the linefill buffer are pushed back to the external system bus to recover dirty linefill buffer data after a linefill request failure. As can be seen in FIG. 1 (Prior Art), the relationship of the prior linefill buffer 108 with the system bus has been a one-way direction for data to flow from the system bus through the bus interface unit (BIU) 110 into the linefill buffer 108. In contrast, as described herein, a bi-directional transfer is created for the linefill buffer 108 where data can be transferred from the linefill buffer 108 back to the system bus through the linefill buffer (LFB) write-back path 202, as shown in FIG. 2 and described below. Because the linefill buffer 108 already holds the information that is needed to recover dirty data that is part of the linefill request, treating the linefill buffer 108 essentially as a store buffer (e.g., buffer that holds data to be stored in external memory) under certain failure conditions helps to prevent the loss of data without the need of storing the linefill buffer data in a separate store buffer 104, as is done in FIG. 1 (Prior Art).

FIG. 2 is a block diagram of an example embodiment 200 for a cache system that provides a linefill buffer (LFB) write-back path 202 from the linefill buffer 108 to the system bus, which can be used during a linefill request failure to recover dirty data held within the linefill buffer 108. As with embodiment 100 of FIG. 1 (Prior Art), a load/store unit 102, which communicates with a processor, provides control signals 121 to a cache controller (CTRL) 107 and provides control and/or data signals 120, 122, and 124 to the linefill buffer 108, the cache 106, and the store buffer 104, respectively. The cache 106 communicates data to and from the bus interface unit (BIU) 110 through connection 128. The cache 106 also sends data to the store buffer 104 using connection 132. The store buffer 104 sends data to the bus interface unit (BIU) 110 through connection 126. Linefill buffer 108 receives data from the bus interface unit (BIU) 110 through connection 130 and sends data to cache 106 through connection 134. The cache controller (CTRL) 107 provides control signals to the linefill buffer 108, the cache 106, and the store buffer 104. The store buffer 104, the cache 106, and the linefill buffer 108 provide bus request signals 140, 142, and 144 to multiplexer (MUX) 112, respectively. A request select (REQUEST SELECT) signal 116 is provided to multiplexer (MUX) 112 to determine which of the bus request signals 142, 144, and 146 is provided as the bus request (BUS REQUEST) signal 114 to the bus interface unit (BIU) 110. The bus interface unit (BIU) 110 communicates data to and from an external memory using a system bus coupled to connection 118. In contrast with FIG. 1 (Prior Art), however, a linefill buffer write-back (LFB WRITE-BACK) path 202 is provided for pushing dirty data within the linefill buffer 202 to the system bus through the bus interface unit (BIU) 110 upon the occurrence of a linefill request failure, such as a bus failure.

By pushing dirty data within the linefill buffer 108 back to the system bus upon occurrence of a linefill request failure, the dirty data can be recovered and used to update external memory without requiring the use of space within the store buffer 104 to hold a copy of the linefill buffer 108, as done in FIG. 1 (Prior Art). This recovery of dirty linefill buffer data addresses failure events, such as failures with the external system that prevent the system bus from returning all the data for a linefill request. If the linefill buffer 108 is clean upon the occurrence of such a failure event, its contents can simply be discarded without being stored in the cache 106. However, if the linefill buffer 108 contains dirty data, recovery of the dirty linefill buffer data is achieved by the embodiments described herein by pushing the dirty data within the linefill buffer 108 to the external bus through the bus interface unit (BIU) 110. This dirty linefill data is then used to update data stored within the main memory, such as an external memory, so that it contains the most recent data.

Advantageously, the embodiments described herein provide a solution to recovering dirty linefill data that has lower cost and better performance than the prior solution in FIG. 1 (Prior Art). The disclosed embodiments can in part use control and data functionality that already exists as part of normal linefill operations of the linefill buffer 108. Further, the disclosed embodiments add functionality to push dirty linefill data only upon the occurrence of a failure during a linefill request. In particular, rather than injecting extra cycles unconditionally to store a copy of the linefill buffer data as required with respect to FIG. 1 (Prior Art), the embodiments disclosed here utilize extra cycles only when the failure condition actually happens. As such, a cycle penalty is avoided when the failure condition does not occur. Further, as the linefill request failure condition is relatively rare, the cycle penalty is also rarely suffered with the disclosed embodiments, while the cycle penalty is always present for the embodiment 100 of FIG. 1 (Prior Art).

It is further noted that the embodiments disclosed herein can utilize programmed processing circuitry to control the functional operations described herein. For example, programmed processing circuitry, such as cache controller 107, can be implemented as a microcontroller, microprocessor, FPGA (field programmable gate array), and/or other processing circuitry configured to provide the functional operation described herein, such as the processes described in the flow diagrams described below with respect to FIGS. 3 and 5. Further, multiple processing blocks could also be used to implement the described embodiments, if desired. For example, the cache controller 107 could be configured to control a portion of the functional operations, and other processing circuitry, such as load/store unit 102, could be configured to perform other functional operations. Still further, the operation of the processing circuitry utilized can be controlled by firmware and/or other instructions stored within a tangible storage medium that are accessed and run by the processing circuitry to provide control for the functional operations described herein. Other variations could also be implemented, as desired.

Figure 3:
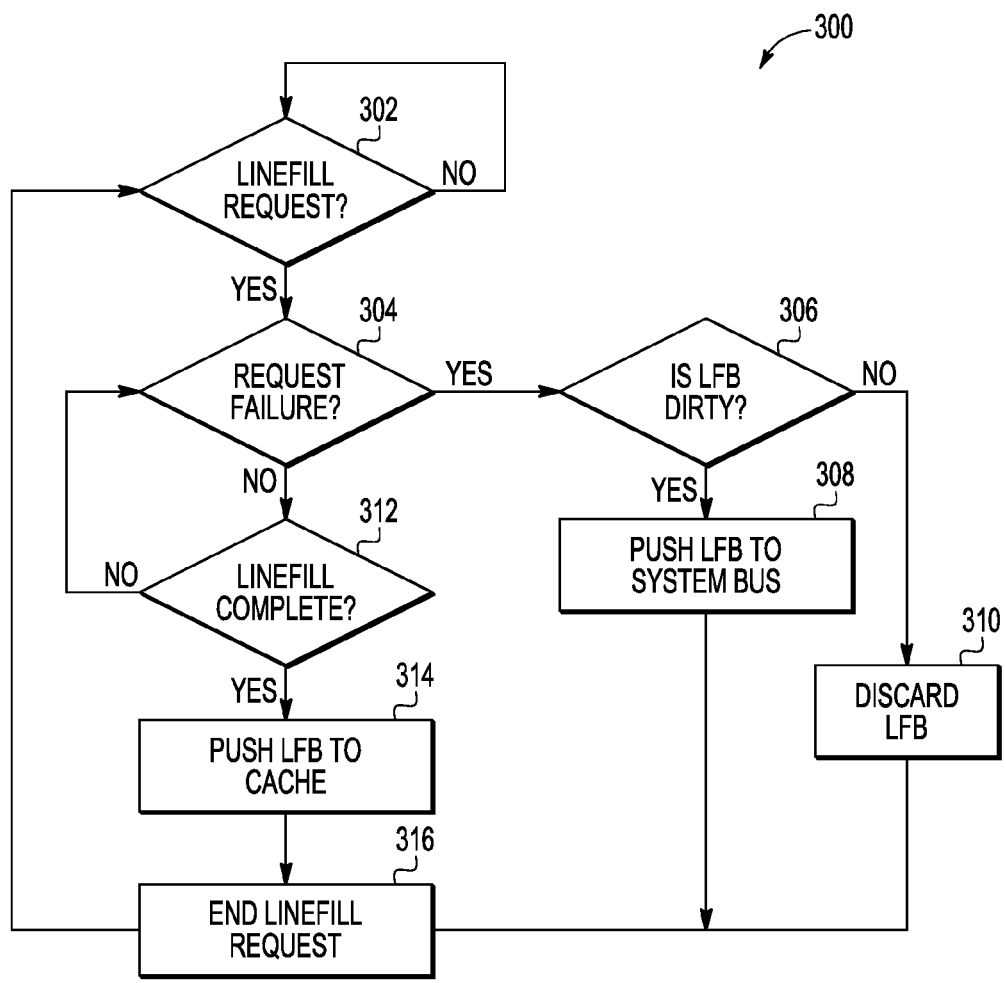
FIG. 3 is a process flow diagram of an example embodiment for pushing linefill buffer data to a system bus upon a failure during a linefill request.

FIG. 3 is a process flow diagram of an example embodiment 300 for pushing dirty linefill buffer data to a system bus upon a failure during a linefill request. In block 302, a determination is made whether a linefill request has been initiated. If "NO," then flow passes back to block 302. If "YES," then flow passes to block 304 where a determination is made whether a linefill request failure has occurred, such as a system bus error. If "YES," then block 306 is reached where a determination is made whether the linefill buffer (LFB) contains dirty data. If "YES," block 308 is reached where the contents of the linefill buffer (LFB) are pushed to the system bus. If "NO," block 310 is reached where the contents of the linefill buffer (LFB) are discarded. From block 308 and block 310, flow passes to block 316 where the linefill request ends. If the determination in block 304 is "NO," then flow passes to block 312 where a determination is made whether the linefill request has completed. If "NO," then flow passes back to block 304. If "YES," then flow passes to block 314 where the completed cache line in the linefill buffer (LFB) is pushed to the cache. Flow then passes to block 316 where the linefill request ends. From block 316, flow passes back to block 302. Variations could also be implemented as desired.

Figure 4:
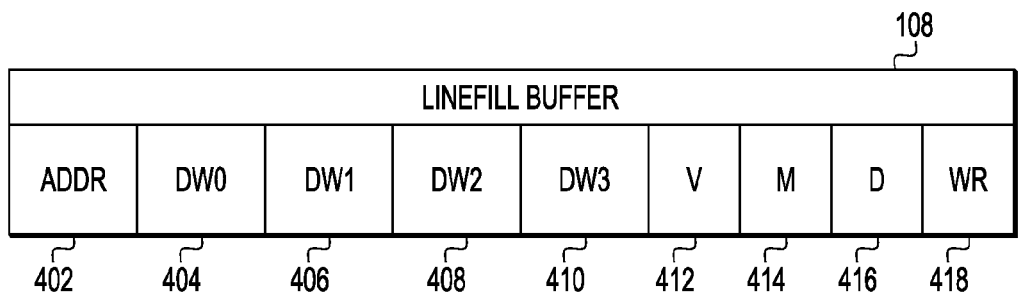
FIG. 4 is data format diagram of an example embodiment for contents of a linefill buffer.

FIG. 4 is data format diagram of an example embodiment 400 for the contents of a linefill buffer 108. For the embodiment depicted, the linefill buffer 108 includes address bytes 402 that are used to hold the cache line address where the linefill buffer data will be stored on completion of the linefill request. The linefill also includes four double-word bytes (DW0, DW1, DW2, DW3) 404, 406, 408, and 410 that are used to hold the cache line data that will be stored in the cache based upon the linefill request.

As described herein, this data is provided from external memory through the system bus and the bus interface unit (BIU) 110. The linefill buffer 108 also includes a valid bit (V) 412, merge flag bits (M) 414, a dirty bit (D) 416, and write request bit (WR) 418. The valid bit (V) 412 is used to indicate whether or not the cache line within the linefill buffer 108 is valid. The merge flag bits (M) 414 are used to indicate which bytes within the double-word bytes (DW0, DW1, DW2, DW3) 404, 406, 408, and 410 have been updated within the linefill buffer 108. The dirty bit (D) 416 is used to indicate if the data within the linefill buffer 108 is dirty. It is again noted that "dirty" data represents data that is newer (e.g., has been more recently updated or changed) than the data stored in the external memory. The write request bit (WR) 418 can also be included and used to indicate if a write-back request should be issued to the system bus upon a linefill request failure, as described in more detail with respect to FIG. 5 below. Other status bits could also be included within the linefill buffer, such as a busy bit that indicates whether the linefill is still in process of using the linefill buffer 108 to receive the cache line. It is noted that variations could be implemented, as desired, and different and/or additional data and status bits could also be included as part of the contents of the linefill buffer 108, if desired.

Figure 5:
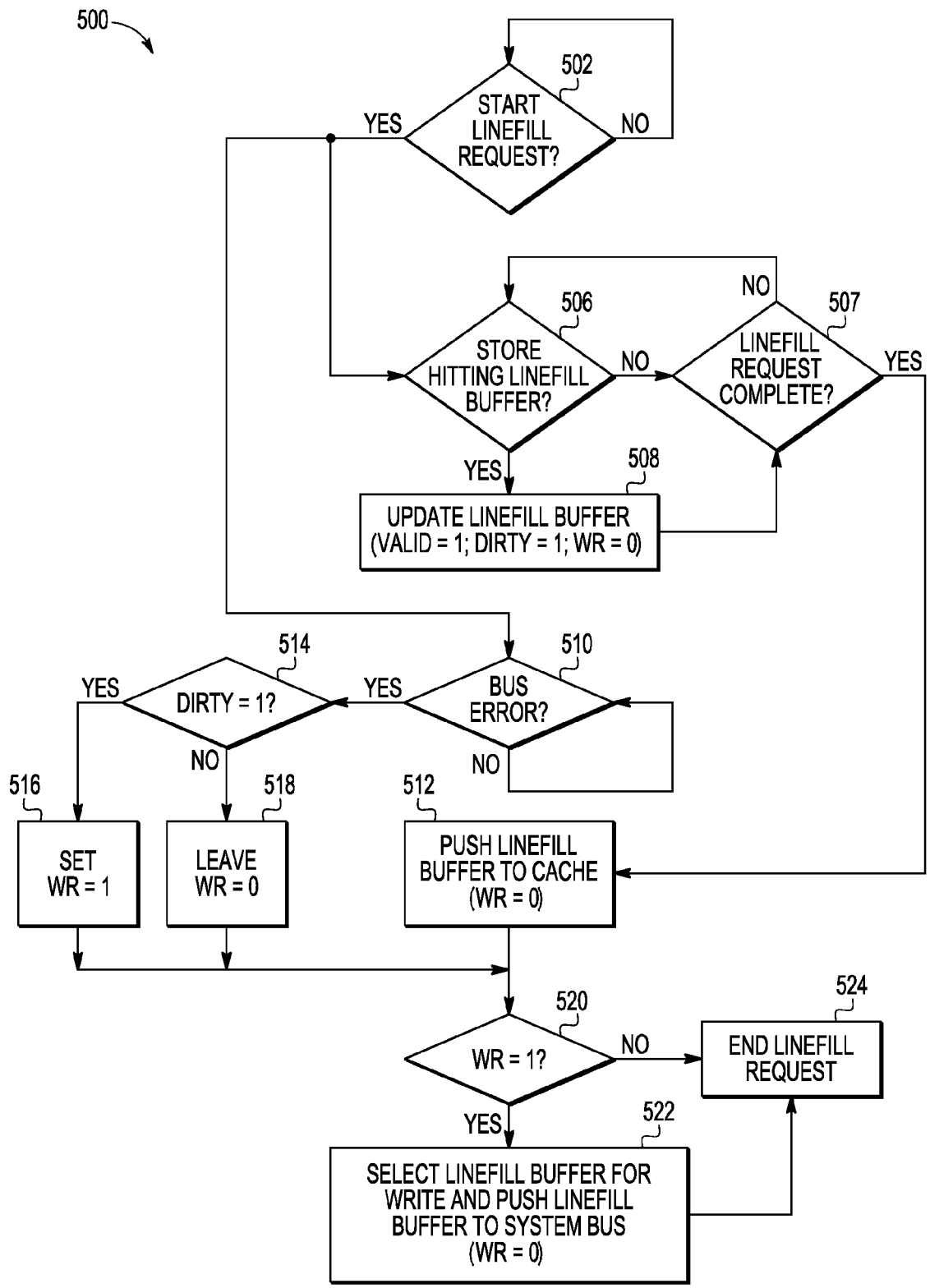
FIG. 5 is a process flow diagram of an example embodiment for controlling the linefill buffer suffering from a bus failure during a linefill request.

FIG. 5 is a process flow diagram of an example embodiment 500 for controlling the linefill buffer 108 during a linefill buffer request and a bus failure during a linefill request. In block 502, a determination is made whether a linefill request has started. If "NO," then flow passes back to block 502. If "YES," then flow passes to block 506 and to block 510. It is noted that a linefill request can be initiated, for example, where a cache system 200 is in copyback mode and a cacheable store miss occurs. Other events can also initiate a linefill request for the cache system 200. Block 506 and block 510 each represent processing loops that will run during the linefill request.

In block 506, a determination is made whether a store request is hitting the linefill buffer 108 such that data within the linefill buffer 108 is to be updated. If "NO," then flow passes back to block 507. If "YES," then flow passes to block 508 where the data in the linefill buffer is updated. In addition, within block 508, the valid bit (V) 412 is set to "1" to indicate that the linefill buffer 108 is valid; the dirty bit (D) 416 is set to "1" to indicate that the data within the linefill buffer 108 is dirty, and the write request bit (WR) 418 is set to "0" to indicate that a write-back of the linefill buffer 108 is not yet needed. Flow then proceeds to block 507. In block 507, a determination is made whether the linefill request has completed. If "NO," then flow passes back to block 506. If "YES," then flow passes to block 512 where the linefill buffer 108 is pushed to the cache 106. The write request bit (WR) 418 is set to "0." Flow then passes to block 520.

In block 510, a determination is made whether a bus error has occurred. If "NO," the flow passes back to block 510, and the system bus is still monitored. If no bus error occurs before the linefill request completes and block 512 is reached, then the processing loop represented by block 510 will end. If "YES" and a bus error has occurred, then flow passes to block 514 where a determination is made whether the dirty bit (D) 416 is set to "1" to indicate that the linefill buffer data is dirty. If "NO," then flow passes to block 518 where the write request bit (WR) 418 is left at "0" to indicate that a linefill buffer write request to the system bus is not needed. If "YES," then flow passes to block 516 where the write request bit (WR) 418 is set to "1" to indicate that a linefill buffer write request to the system bus is needed. Flow then passes from block 516 or block 518 to block 520 where a determination is made whether the write request bit (WR) 418 is set to "1." If "NO," then flow passes to block 524 where the linefill request is ended. If "YES," then flow passes to block 522 where the linefill buffer 108 is selected for a write to the system bus through the bus interface unit (BIU) 110. The data within the linefill buffer 108 is then pushed to the system bus, and the write request bit (WR) 418 is set back to "0." Flow then passes to block 522. It is noted that when the processing loop represented by block 506 is ended once a bus error occurs, as a bus error during a linefill request indicates that an event occurred that has kept necessary linefill data from being received through the system bus.

It is noted that while the embodiment 500 utilizes a "1" to indicate that a condition exists and a "0" to indicate that a condition does not exist, different indications could be utilized if desired. For example, a "0" could be used to indicate that a condition exists, and a "0" could be used to indicate that a condition does not exist. Further, multiple status bits could also be used, if desired. Other variations could also be implemented while still utilizing the write-back of the linefill buffer described herein.

Figure 6:
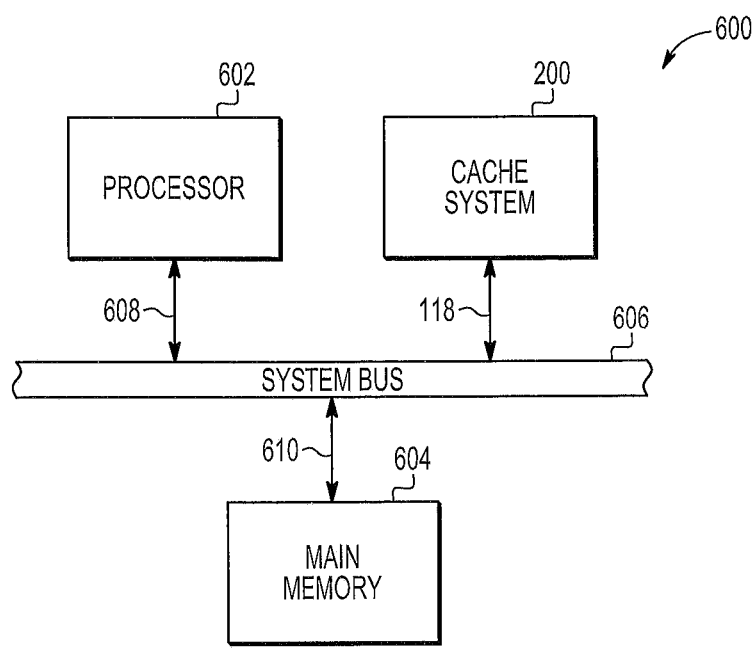
FIG. 6 is a block diagram of a processor system including a cache system of FIG. 2.

FIG. 6 is a block diagram of a processor system 600 including a cache system 200. The processor 602 is coupled to the system bus 606 through connections 608. As described above, the cache system 200 is coupled to the system bus through connections 118. A main memory 604 is also coupled to the system bus 606 through connections 610. It is noted that the processor system 600 can be implemented as different integrated circuits or within a single integrated circuit, as desired. For example, the processor 602, the main memory 604, and the cache system 200 can be integrated on a single integrated circuit, if desired. Further a separate integrated circuit can be provide for each of the processor 602, the main memory 604, and the cache system 200, if desired. Other functional blocks could also be provided, and variations could also be implemented, as desired, while still utilizing stores of the linefill buffer 108 to recover dirty linefill buffer data upon occurrence of linefill request failures.

The processor system 600 can utilize the cache system 200 as described herein to recover dirty linefill buffer data. For example, if the load/store unit 102 issues new stores that belong to the pending line within the linefill buffer 108 during a cache linefill in copyback mode, these stores do not go out to the system bus 606. Instead, they are gathered in the linefill buffer 108. As described above, the linefill buffer 108 can be sized, if desired, to hold a cache line that is four double-word bytes (DW0, DW1, DW2, DW3) 404, 406, 408, and 410. The linefill buffer 108 gathers the stores to the associated double-word byte and marks the valid store bytes for that entry. The dirty bit is also set within the linefill buffer to mark the buffer as dirty. The data returned from the external system bus 606 for the linefill request is overridden by the dirty data stores. When the system bus 606 has returned all of the data to the linefill buffer 108 from the main memory 604 for the linefill request, the linefill buffer 108 pushes its dirty data into the cache 106 and sets the dirty bit for that cache line. This represents a successful completion of a linefill request.

However, if the system bus 606 fails to return all of the needed data to the linefill buffer 108 due to a bus error or other failure, the linefill request cannot be complete. Thus, the contents of the linefill buffer 108 will not be pushed into the cache 106. As described above, if the aborted linefill buffer 108 has been marked as dirty, then the linefill buffer will issue writes to the system bus 606 through the bus interface unit (BIU) 110 until all of its dirty data has been written to the external memory 604. If the linefill buffer 108 is configured to include four double-word bytes, then at most four double-word writes will be issued, even if the load/store unit 102 may have issued many more stores to the linefill buffer 108. This result occurs because the stores are gathered and lumped together with respect to the double-word bytes that they target. This gathering may result in contiguous or non-contiguous bytes within the linefill buffer 108 being dirty. It is noted that the ability for the linefill buffer 108 to issue stores to the external bus 604 through the bus interface unit (BIU) 110 can be controlled by the bits in a control register, if desired. Other variations could also be implemented, as desired.

It is noted that the contents of the linefill buffer 108 could first be stored in the store buffer 104 upon occurrence of a linefill request bus failure while the linefill buffer 108 is marked as dirty. If this is done, then the store buffer 104 then issues the store of the dirty linefill buffer data to the system bus 606 through the bus interface unit (BIU) 110. For this further embodiment, the contents of the linefill buffer 108 are only stored in the store buffer 104 upon occurrence of a linefill request failure and not at all times, as occurs with respect to the embodiment 100 in FIG. 1 (Prior Art).

Advantageously, utilizing the embodiments described herein, the linefill buffer 108 is sufficient for recovering dirty linefill buffer data, and there is no requirement to use other buffers for this purpose, including the store buffer 104. Further, it is noted that the linefill buffer 108 can be configured to have the capability of storing data associated with copyback stores. Further, the bus interface unit (BIU) 110 can be configured to accept data along path 202 from the linefill buffer 108 and to accept single write transactions associated with the linefill buffer 108. Further, the bus interface unit (BIU) 110 can be configured to support write transactions that are a gathering of many stores. In addition, the byte-strobes that are associated with a write transaction can indicate which bytes are valid, as there can be invalid bytes between valid bytes.

The following is one example that shows advantages of the described embodiments for store commands (e.g., stores) that are hitting a linefill buffer in comparison with the embodiment of FIG. 1 (Prior Art). As described below, stores can cause a stall of the store buffer 104 in the embodiment of FIG. 1 (Prior Art) even if no linefill failure occurs. In contrast, the embodiments described herein will not suffer from this stall, as additional cycles are only expended when a linefill request failure actually occurs. In the following example sequence, there are four store requests to double-word A0 and double-word A1 of the same cache line (Cache Line A) in copyback mode. There is also another store request in write-through mode to a different cache line (Cache Line B).

STORE1 addrA0, byte__1000__0000
    STORE2 addrA0, byte__0100__0000
    STORE3 addrB, byte__1111__1111
    STORE4 addrA1, byte__0000__1000
    STORE5 addrA0, byte__0000__0001

For this example, STORE1 is a cache miss and triggers a linefill request for Cache Line A. As such, the linefill for Cache Line A will be in progress over the next four requests from STORE2 to STORE5. It is also noted that "byte_xxxx_xxxx" represents a byte strobe where a "1" for an "x" represents a byte that is being changed and a "0" for an "x" represents a byte that is not being changed.

For the embodiment 100 of FIG. 1 (Prior Art), the stores to Cache Line A are written to the linefill buffer 108 but at the same time they are also written to the store buffer 104, such that a copy of the linefill buffer (LFB COPY) 136 is provided to the store buffer 104. These stores are gathered into two double-words thereby taking away entries within store buffer 104 that would otherwise have been reserved for future write-through stores. For embodiment 100, therefore, the store buffer 104 is used to provide place holders for dirty linefill data while waiting for completion of the linefill request. If the linefill request fails to complete for some reason, the store buffer 104 pushes these dirty stores out to system bus 606. Thus, not only is the store buffer 104 giving away its entries for the copy of the linefill buffer entries, store buffer 104 also gets stalled from going out to the system bus 606 while the linefill is busy as one of these linefill store copies will be sitting at the bottom of the store buffer 104. The bottom of the store buffer 104 represents the next entry that is going out from the FIFO (first-in-first-out) store buffer 104 to the system bus 606. For this example, all five stores will be in the store buffer 104 with STORE1 being at the bottom of the store buffer 104. However, because STORE1 has to wait for the linefill request of Cache Line A to complete, it cannot go to the system bus 606. This waiting causes STORE3, which is behind STORE1, to be stuck in the store buffer 104, even though STORE3 is targeting Cache Line B and is not related to the pending linefill of Cache Line A. Thus, even if the linefill of Cache Line A completes successfully, STORE1-2 and STORE4-5 are still sitting within the store buffer 104 and will then be discarded from the store buffer 104 without any action. Thus, STORE3 for Cache Line B will then go out to the system bus, but only after being stalled by the copy of the linefill buffer (LFB COPY) 136 that is held within the store buffer 104.

In contrast, for the embodiments described herein, this stall of the store buffer 104 will not occur, as the contents of linefill buffer 108 are pushed back to the system bus 606 from the linefill buffer 108 itself when a linefill request failure occurs when the linefill buffer data is dirty. With respect to the example sequence of stores above for the disclosed embodiments, the dirty stores to Cache Line A are still written to linefill buffer 108. However, they do not need to be copied to the store buffer 104. For the above example, STORE3 to Cache Line B is the only store that goes to the store buffer 104, and the store buffer 104 will proceed to the external bus 606 independent of the pending linefill request associated with Cache Line A. In the event that the linefill request fails and dirty linefill buffer data does not go to the cache 106, the linefill buffer 104 will push STORE1, STORE2, STORE4, and STORE5 to the system bus 606. For example, these four stores can be pushed to the system bus 606 through the bus interface unit (BIU) 110 using two double-word write transactions, as follows:

WRITE (1) to bus at Addr0, byte__1100__0000 for
    STORE1 addrA0, byte__1000__0000, and
    STORE2 addrA0, byte__0100__0000; and
WRITE (2) to bus Addr1, byte__0000__1001 for
    STORE4 addrA1, byte__0000__1000,
    STORE5 addrA1, byte__0000__0001.

Thus, by pushing the dirty data from the linefill buffer 108 to the system bus 606 without requiring a copy of the linefill buffer data to be stored in the store buffer 104, the disclosed embodiments improve the performance of the store buffer 104 while still allowing for dirty data in the linefill buffer 104 to be recovered when a linefill request failure occurs.

It is again noted that the dirty data within the linefill buffer 104 can be pushed to the system bus 606 directly from the linefill buffer 108 through the bus interface unit (BIU) 110, indirectly from the linefill buffer 108 through the store buffer 104 and then through the bus interface unit (BIU) 110, and/or using another desired technique to push the dirty linefill data from the linefill buffer to the system bus 606 upon a linefill request failure. Other variations could also be utilized if desired.

As described herein, a variety of embodiments can be implemented and different features and variations can be implemented, as desired.

In one embodiment, a cache system is disclosed that includes a cache configured to store a plurality of cache lines, a linefill buffer configured to store at least one cache line, a load/store unit configured to store data received from a system bus within the linefill buffer during a linefill request for the cache, and a cache controller configured to mark the stored data as dirty if updated while within the linefill buffer and to push the dirty data from the linefill buffer to the system bus if the linefill request fails.

In other embodiments, the linefill buffer is configured to store data in the form of a plurality of double-word bytes. In addition, the linefill buffer can be configured to have at least one write request bit that indicates whether data is to be written to the system bus upon a linefill request failure. In further embodiments, the cache system further includes a bus interface unit configured to be coupled to a system bus, and the cache controller is configured to push the dirty data from the linefill buffer to the system bus through the bus interface unit. In other embodiments, the cache system further includes a bus interface unit configured to be coupled to a system bus and a store buffer configured to store data to be written to external memory, and the cache controller is configured to push the dirty data from the linefill buffer to the system bus through the store buffer and the bus interface unit. Still further, the cache controller can be further configured to discard the data in the linefill buffer if the data is not marked as dirty and the linefill request fails. In addition, the cache controller can be configured to utilize a plurality of write requests to a bus interface controller to push the dirty data from the linefill buffer to the system bus. Further, the linefill buffer can be configured to have at least one dirty bit that indicates whether data within the linefill buffer is dirty.

In one other embodiment, a processor system is disclosed including, a processor coupled to a system bus, a memory coupled to the system bus, and a cache system coupled to the system bus and configured to store cache lines from the memory and to communicate cache lines to the processor through the system bus. The cache system includes a cache configured to store a plurality of cache lines, a linefill buffer configured to store at least one cache line, a load/store unit configured to store data from the system bus within the linefill buffer during a linefill request for the cache system, and a cache controller configured to mark the stored data as dirty if updated while within the linefill buffer and to push the dirty data from the linefill buffer to the system bus if the linefill request fails.

In other embodiments, the cache system further includes a bus interface unit coupled to the system bus, and the cache controller is configured to push the dirty data from the linefill buffer to the system bus through the bus interface unit. In further embodiments, the cache system further includes a store buffer configured to be used to store data to be written to the memory, and the cache controller is configured to push the dirty data from the linefill buffer to the system bus through the store buffer and the bus interface unit. Still further, the cache controller can be configured to utilize a plurality of write requests to a bus interface controller to push the dirty data from the linefill buffer to the system bus. In addition, the linefill buffer can be configured to have at least one dirty bit that indicates whether data within the linefill buffer is dirty and to have at least one write request bit that indicates whether data is to be written to the system bus upon a linefill request failure.

In one further embodiment, a method is disclosed for recovering dirty linefill buffer data after linefill request failures including receiving data from a system bus for a linefill request for a cache within a cache system, storing the data within a linefill buffer during the linefill request, marking the stored data as dirty if updated while within the linefill buffer, and pushing the dirty data from the linefill buffer to the system bus if the linefill request fails. Still further, the method can include updating data within a main memory using the dirty data pushed to the system bus.

In other embodiments, the method can further include setting at least one write request bit within the linefill buffer to indicate whether data is to be written to the system bus upon a linefill request failure. Further, the pushing step can include pushing the dirty data from the linefill buffer through a bus interface unit to the system bus. In addition, the pushing step can include pushing the dirty data from the linefill buffer to a store buffer and from the store buffer through a bus interface unit to the system bus. Still further, the pushing step can include utilizing a plurality of write requests to a bus interface controller to push the dirty data from the linefill buffer to the system bus. In further embodiments, the method can further include discarding the data in the linefill buffer if the data is not marked as dirty and the linefill request fails. Further, the method can include setting at least one bit in the linefill buffer to indicate whether data within the linefill buffer is dirty.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A cache system, comprising:
   a cache configured to store a plurality of cache lines;
   a linefill buffer configured to store at least one cache line;
   a load/store unit configured to store data within the linefill buffer during a linefill request for the cache, the stored data being received from a system bus; and
   a cache controller configured to mark the stored data as dirty if updated within the linefill buffer during the linefill request and to push the dirty data from the linefill buffer to the system bus if the linefill request fails.

2. The cache system of claim 1, wherein the linefill buffer is configured to store data in the form of a plurality of double-word bytes.

3. The cache system of claim 1, wherein the linefill buffer is configured to have at least one write request bit that indicates whether data is to be written to the system bus upon a linefill request failure.

4. The cache system of claim 1, wherein the cache system further comprises a bus interface unit configured to be coupled to a system bus, and wherein the cache controller is configured to push the dirty data from the linefill buffer to the system bus through the bus interface unit.

5. The cache system of claim 1, wherein the cache system further comprises a bus interface unit configured to be coupled to a system bus and a store buffer configured to store data to be written to external memory, and wherein the cache controller is configured to push the dirty data from the linefill buffer to the system bus through the store buffer and the bus interface unit.

6. The cache system of claim 1, wherein the cache controller is further configured to discard the data in the linefill buffer if the data is not marked as dirty and the linefill request fails.

7. The cache system of claim 1, wherein the cache controller is configured to utilize a plurality of write requests to a bus interface controller to push the dirty data from the linefill buffer to the system bus.

8. The cache system of claim 1, wherein the linefill buffer is configured to have at least one dirty bit that indicates whether data within the linefill buffer is dirty.

9. The cache system of claim 1, wherein the dirty data pushed to the system bus is available for an update to a memory.

10. A processor system, comprising:
    a processor coupled to a system bus;
    a memory coupled to the system bus; and
    a cache system coupled to the system bus and configured to store cache lines from the memory and to communicate cache lines to the processor through the system bus, the cache system comprising:
       a cache configured to store a plurality of cache lines;
       a linefill buffer configured to store at least one cache line; and
       a load/store unit configured to store data within the linefill buffer during a linefill request for the cache system, the stored data being received from the system bus; and
       a cache controller configured to mark the stored data as dirty if updated within the linefill buffer during the linefill request and to push the dirty data from the linefill buffer to the system bus if the linefill request fails.

11. The processor system of claim 10, wherein the cache system further comprises a bus interface unit coupled to the system bus, and wherein the cache controller is configured to push the dirty data from the linefill buffer to the system bus through the bus interface unit.

12. The processor system of claim 10, wherein the cache system further comprises a store buffer configured to be used to store data to be written to the memory, and wherein the cache controller is configured to push the dirty data from the linefill buffer to the system bus through the store buffer and the bus interface unit.

13. The processor system of claim 10, wherein the linefill buffer is configured to have at least one dirty bit that indicates whether data within the linefill buffer is dirty and to have at least one write request bit that indicates whether data is to be written to the system bus upon a linefill request failure.

14. The processor system of claim 10, wherein the dirty data pushed to the system bus is available for an update to the memory.

15. A method for recovering dirty linefill buffer data after linefill request failures, comprising:
    receiving data from a system bus for a linefill request for a cache within a cache system;
    storing the data within a linefill buffer during the linefill request;
    marking the stored data as dirty if updated while within the linefill buffer; and
    pushing the dirty data from the linefill buffer to the system bus if the linefill request fails.

16. The method of claim 15, further comprising updating data within a main memory using the dirty data pushed to the system bus.

17. The method of claim 15, further comprising setting at least one write request bit within the linefill buffer to indicate whether data is to be written to the system bus upon a linefill request failure.

18. The method of claim 15, wherein the pushing step comprises pushing the dirty data from the linefill buffer through a bus interface unit to the system bus.

19. The method of claim 15, wherein the pushing step comprises pushing the dirty data from the linefill buffer to a store buffer and from the store buffer through a bus interface unit to the system bus.

20. The method of claim 15, further comprising discarding the data in the linefill buffer if the data is not marked as dirty and the linefill request fails.

21. The method of claim 15, wherein the pushing step comprises utilizing a plurality of write requests to a bus interface controller to push the dirty data from the linefill buffer to the system bus.

22. The method of claim 15, further comprising setting at least one bit in the linefill buffer to indicate whether data within the linefill buffer is dirty.

* * * * *